United States Patent Office 3,832,313
Patented Aug. 27, 1974

3,832,313
WATER SOLUBLE FILMS FROM HEMICELLULOSE
Marten Reintjes and Laurence Dean Starr, Shelton, Wash., assignors to International Telephone and Telegraph Corporation, New York, N.Y.
No Drawing. Filed Dec. 18, 1972, Ser. No. 316,065
Int. Cl. C08b 19/00, 25/00
U.S. Cl. 260—9   6 Claims

ABSTRACT OF THE DISCLOSURE

Water soluble films are prepared from hardwood hemicelluloses by reacting the hemicelluloses in an alkaline medium with epichlorohydrin and an alkanolamine or glycerol. The reaction product upon purification, and neutralization, can be dried to form strong, flexible, non-hygroscopic, water soluble films. The hemicelluloses are extracted from hardwood or separated from pulp bleaching and refining effluents by known methods.

---

This invention relates to water soluble films produced from hemicellulose and to a process for their preparation.

The effluent streams from pulp mill bleaching and refining operations contain large quantities of hemicelluloses for which a satisfactory and profitable method of disposal has long been sought. While hemicelluloses, like celluloses, are polysaccharides found in wood and other plant materials they differ from celluloses in many ways. Celluloses are normally fibrous and at least partially crystalline. Hemicelluloses are non-fibrous and essentially amorphous. Chemically and structurally speaking, both hardwood and softwood celluloses are long-chain polymers of predominantly anhydroglucose monomer units with a number average degree of polymerization (DP) in the native state of about 3,000 to 5,000. Softwood and hardwood hemicelluloses are relatively short-chain polymers of predominantly mannose and xylose monomer units with a DP of about 200 to 400 in the native state. Pulping and refining of the vegetative material reduces the DP of the cellulose to about 1500 to 2000 and for the hemicelluloses in effluent streams to about 20 to 100 respectively. Solubility and reactivity characteristics of celluloses and hemicelluloses differ about as widely. Since presently hemicelluloses are essentially waste products, it is desirable to convert them into useful products, not only because of the economic advantage of doing so but also from an ecological standpoint by eliminating a troublesome disposal problem.

It has been discovered that hardwood hemicelluloses may be reacted in alkaline medium with epichlorohydrin and an alkalolamine or glycerol to form water soluble films. The reaction product, when neutralized and purified as by dialysis, dries to form clear, water-soluble, nonhygroscopic films.

The process is carried out by suspending the hemicelluloses in an excess of a 10 to 30% aqueous sodium hydroxide solution at room temperature or below. A slight excess of an alkanolamine (or glycerol), based on the anhydro sugar units in the hemicelluloses, is slowly stirred into the solution. A slight excess of epichlorohydrin is then slowly stirred into this mixture and the mixing continued until the reaction is complete, which takes from about one to four hours. During the reaction the temperature is maintained below 75° C. and preferably between about 50 and 60° using external cooling as needed since the reaction is exothermic. At the completion of the reaction, at 25–35° C. and with external cooling, concentrated hydrochloric acid is added to neutralize the solution after which it may be dialyzed to remove inorganic salts. The reaction products may be cast on a suitable surface to form the desired film. Upon drying, films are formed which are water soluble, essentially colorless, transparent and relatively strong and flexible.

The hemicelluloses useful in the invention are those which are composed predominantly of xylose units and are substantially free of mannose units, such as hemicelluloses obtained from hardwood. They have a DP of below 400. Suitable examples of alkanolamines are ethanolamine, diethanolamine or diethylaminoethanol.

The following example illustrates the practice of the invention. Unless otherwise indicated, all parts and percentages are by weight.

EXAMPLE 1

A hemicellulosic material essentially devoid of mannose was obtained by extracting a bleached kraft hardwood pulp (gumwood) several times with caustic solutions containing up to 15% NaOH, precipitating the hemicellulosic material from the extract solutions with methanol and washing and drying it. The dried hemicellulose had a standard cuene I.V. value of 0.77 to 0.87 and contained 57.8–62.9% xylans, 0.01 to 0.1% mannans, 0.1–0.2% glucans and up to about 9.7% uronic acids.

Samples comprising six to seven grams each of the foregoing hemicellulosic material were placed in Morton flasks and suspended in 100 ml. portions of 20% NaOH solution at room temperature. Ethanolamine, diethanolamine, diethylaminoethanol and glycerol (0.1 mole) respectively, were then added and the system in each case flushed with nitrogen and kept under an atmosphere of nitrogen throughout the reaction. At room temperature and in the course of five to 15 minutes, 0.1 mole of epichlorohydrin was added. An exotherm occurred with a temperature rise of 5 to 25° C. in the course of ten to 15 minutes after completion of the addition. The reaction mixtures were then stirred for one to four hours at 25 to 75° C. At the end of this period, the mixture was cooled to 25–35° C. and 45 ml. of concentrated hydrochloric acid was added. The resulting acidic solutions were then dialyzed overnight to remove inorganic salts and the purified solutions spread on glass surfaces and dried. Water-soluble, colorless, transparent, relatively strong and flexible films were formed in each case.

Similar preparations made using adducts of the epichlorohydrin and ethanolamine and/or softwood hemicelluloses, however, do not form films.

We claim:

1. A water soluble film comprising the neutralized and dried product of reaction in an alkaline medium at a temperature below 75° C. of a hemicellulose derived from hardwood, epichlorohydrin and a material selected from the group consisting of an alkanolamine and glycerol.

2. The water soluble film of claim 1 in which the hemicellulose and epichlorohydrin are reacted with an alkanolamine selected from the group consisting of ethanolamine, diethanolamine and diethylaminoethanol.

3. The water soluble film of claim 1 in which the hemicellulose and epichlorohydrin are reacted with glycerol.

4. A process for the preparation of a water soluble film comprising
reacting in an alkaline medium at a temperature below 75° C. a hemicellulose derived from hardwood, epichlorohydrin and a material selected from the group consisting of an alkanolamine and glycerol,
neutralizing said reaction product and drying to form a film therefrom.

5. The process of claim 4 in which the reaction product is purified by dialysis prior to forming the film.

6. The process of claim 4 in which the neutralization is carried out with a mineral acid.

(References on following page)

References Cited

UNITED STATES PATENTS

| | | | |
|---|---|---|---|
| 2,120,513 | 6/1938 | Stahn | 260—212 |
| 3,102,112 | 8/1963 | Carter et al. | 260—212 |
| 3,716,526 | 2/1973 | Schweiger | 260—212 |
| 3,723,409 | 3/1973 | Yueh | 260—209 |

WILLIAM H. SHORT, Primary Examiner

E. WOODBERRY, Assistant Examiner

U.S. Cl. X.R.

260—209 R, 212